United States Patent [19]
Seshan

[11] Patent Number: 5,987,559
[45] Date of Patent: Nov. 16, 1999

[54] DATA PROCESSOR WITH PROTECTED NON-MASKABLE INTERRUPT

[75] Inventor: Nat Seshan, Houston, Tex.

[73] Assignee: Texas Instruments Incorporated, Dallas, Tex.

[21] Appl. No.: 09/017,364

[22] Filed: Feb. 2, 1998

[51] Int. Cl.⁶ .................................................. G06F 9/46
[52] U.S. Cl. .......................................... 710/262; 710/266
[58] Field of Search ...................... 710/260–269

[56] References Cited

U.S. PATENT DOCUMENTS

| | | | |
|---|---|---|---|
| 5,511,173 | 4/1996 | Yamaura et al. | 395/375 |
| 5,619,704 | 4/1997 | Yagi et al. | 395/735 |
| 5,649,208 | 7/1997 | Intrater et al. | 395/735 |
| 5,659,759 | 8/1997 | Yamada | 395/738 |
| 5,701,494 | 12/1997 | Satoh | 395/735 |
| 5,748,970 | 5/1998 | Miyaji et al. | 395/733 |
| 5,758,170 | 5/1998 | Woodward et al. | 395/740 |
| 5,764,999 | 6/1998 | Wilcox et al. | 395/734 |
| 5,875,342 | 2/1999 | Temple | 395/733 |

*Primary Examiner*—Ayaz R. Sheikh
*Assistant Examiner*—Jigar Pancholi
*Attorney, Agent, or Firm*—Robby T. Holland; Richard L. Donaldson

[57] ABSTRACT

An interrupt scheme for a data processor includes an enable field for a non-maskable interrupt (NMI). The field is automatically cleared by the data processor when it services the highest priority interrupt, a RESET. The user can set the field to enable a subsequent NMI but cannot himself clear the NMI. This strategy prevents an NMI from interrupting a RESET service routine.

5 Claims, 5 Drawing Sheets

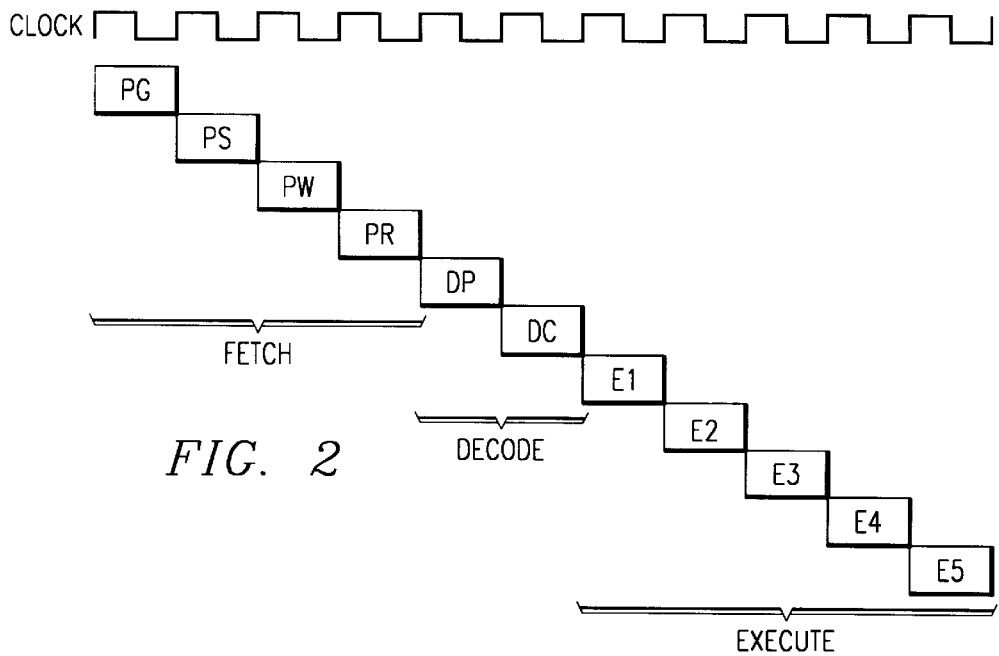
FIG. 2
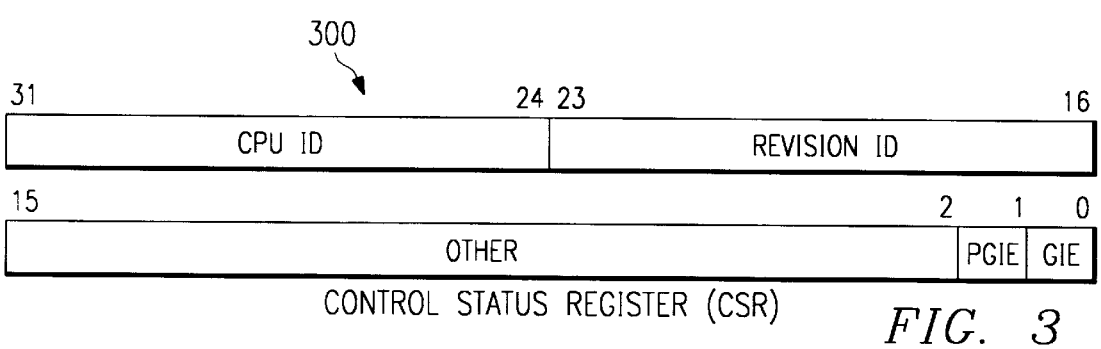
CONTROL STATUS REGISTER (CSR)    FIG. 3
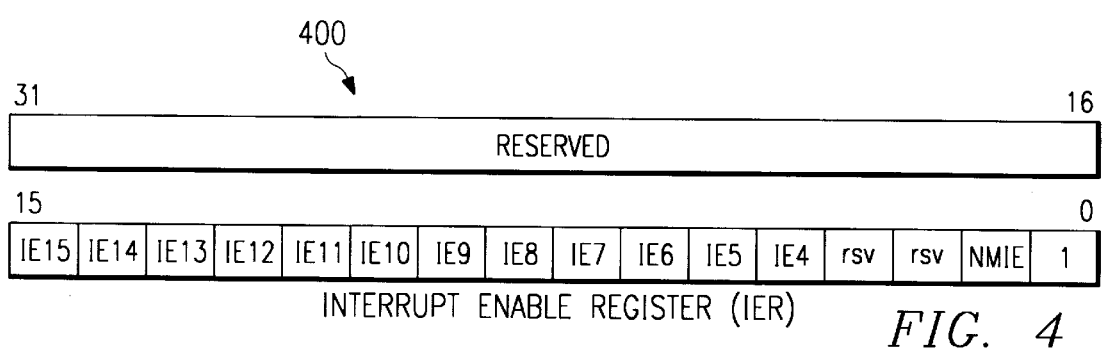
INTERRUPT ENABLE REGISTER (IER)    FIG. 4
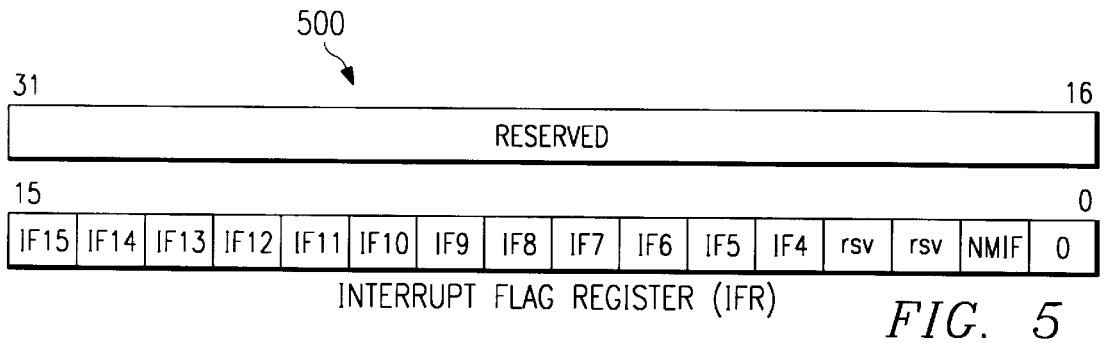
INTERRUPT FLAG REGISTER (IFR)    FIG. 5

700

| 31 | | | | | | | | | | | | | | | 16 |
|---|---|---|---|---|---|---|---|---|---|---|---|---|---|---|---|
| RESERVED | | | | | | | | | | | | | | | |

| 15 | | | | | | | | | | | | | | | 0 |
|---|---|---|---|---|---|---|---|---|---|---|---|---|---|---|---|
| IS15 | IS14 | IS13 | IS12 | IS11 | IS10 | IS9 | IS8 | IS7 | IS6 | IS5 | IS4 | rsv | rsv | rsv | rsv |

INTERRUPT SET REGISTER

800

| 31 | | | | | | | | | | | | | | | 16 |
|---|---|---|---|---|---|---|---|---|---|---|---|---|---|---|---|
| RESERVED | | | | | | | | | | | | | | | |

| 15 | | | | | | | | | | | | | | | 0 |
|---|---|---|---|---|---|---|---|---|---|---|---|---|---|---|---|
| IC15 | IC14 | IC13 | IC12 | IC11 | IC10 | IC9 | IC8 | IC7 | IC6 | IC5 | IC4 | rsv | rsv | rsv | rsv |

INTERRUPT CLEAR REGISTER

DATA PROCESSOR WITH PROTECTED NON-MASKABLE INTERRUPT

TECHNICAL FIELD OF THE INVENTION

This invention relates to data processors, and more particularly relates to mechanisms for responding to interrupts.

BACKGROUND OF THE INVENTION

Data processors run programs by executing a sequence of individual instructions which perform a desired function. The execution of each individual instruction involves several separate steps or stages. Each instruction can be separated into the steps of fetching an instruction from memory, decoding the fetched instruction, and executing the decoded instruction. Other steps are also possible. Generally, advanced data processors contain dedicated logic for each stage so that several instructions can be "in flight" in the data processor at a given time. A different portion of the data processor will process a different instruction, typically for a single clock cycle, before forwarding the instruction onto the next stage. This design strategy is known as pipelining. Factors such as the microarchitecture of the data processor, clock cycle length, complexity of logic and integration of memory into the data processor can affect the number and length of each stage.

The orderly execution of instructions by the data processor must be interrupted from time to time. For example, an input/output ("I/O") device, such as a modem or hard drive may have data ready that needs to be processed by the data processor. Similarly, a user may press a key on a keyboard. To handle such situations, data processors are provided with interrupt capability.

Numerous interrupt schemes have been devised to date. Typically, several inputs to the data processor (externally or internally generated) are dedicated to interrupt signaling. Each signal corresponds to a different possible interrupt. When a device or process requires service, then the device or process asserts its interrupt line. The data processor then ceases execution of its normal routine and branches to a sequence of instructions that will service the interrupt. The start address of the interrupt service routine is stored in an accessible storage location for this purpose. For instance, if a keyboard generates the interrupt, then the data processor will read a stored value corresponding to the keyboard interrupt line and branch to the instructions beginning at that address. These interrupt service routine instructions might read the pressed key on its data bus and load the value into memory. After the interrupt, the data processor returns to next instruction it would have executed had the interrupt not occurred.

The processing of interrupts is complicated by their number and their flexibility. There are often several classes of interrupts in a single data processor. Each class is accorded an importance relative to each other class. And, if there is more than one interrupt in a class, then the class members are ranked with respect to each other. It is therefore possible for a higher priority interrupt to interrupt a lower priority interrupt. Also, some interrupts are "maskable." When masked, an interrupt is not acted upon by the data processor. However, the masked interrupt must be captured by the data processor for later sampling or "polling."

These and other features of interrupt schemes require the data processor to determine each cycle which is the most important interrupt that is asserted and is not masked, if any. Once the data processor determines the correct interrupt, then it must determine the correct address to which it should branch. Eventually the data processor can begin fetching instructions at the appropriate address. Consequently, servicing interrupts takes a significant amount of processor time. Simultaneously, the data processor must account for the possibility of a second interrupt. This possibility usually requires complex control circuitry. It is desirable to reduce the processing time of interrupts and the complexity of their control circuitry while maintaining their flexibility.

SUMMARY OF THE INVENTION

The present invention provides a method for providing an interrupt mechanism for a microprocessor. A control register having a first field is user writeable to a first state only. Control circuitry is responsible for executing interrupt service routines responsive to a first and a second interrupt signal. The control circuitry also writes the second state to the control register upon executing the interrupt service routine for the first interrupt. The control circuitry will execute the second interrupt service routine if and only if the control register contains a value equal to the first state.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which:

FIG. 2 depicts a timing diagram of an instruction executed by the data processor illustrated in FIG. 1;

FIGS. 3 through 8 depict a graphical representation of various control registers of the data processor illustrated in FIG. 1 used in interrupt processing;

FIG. 9 depicts a flow diagram of one aspect of the operation of the data processor illustrated in FIG. 1;

DETAILED DESCRIPTION OF TEH PREFERRED EMBODIMENT

Figure 1:
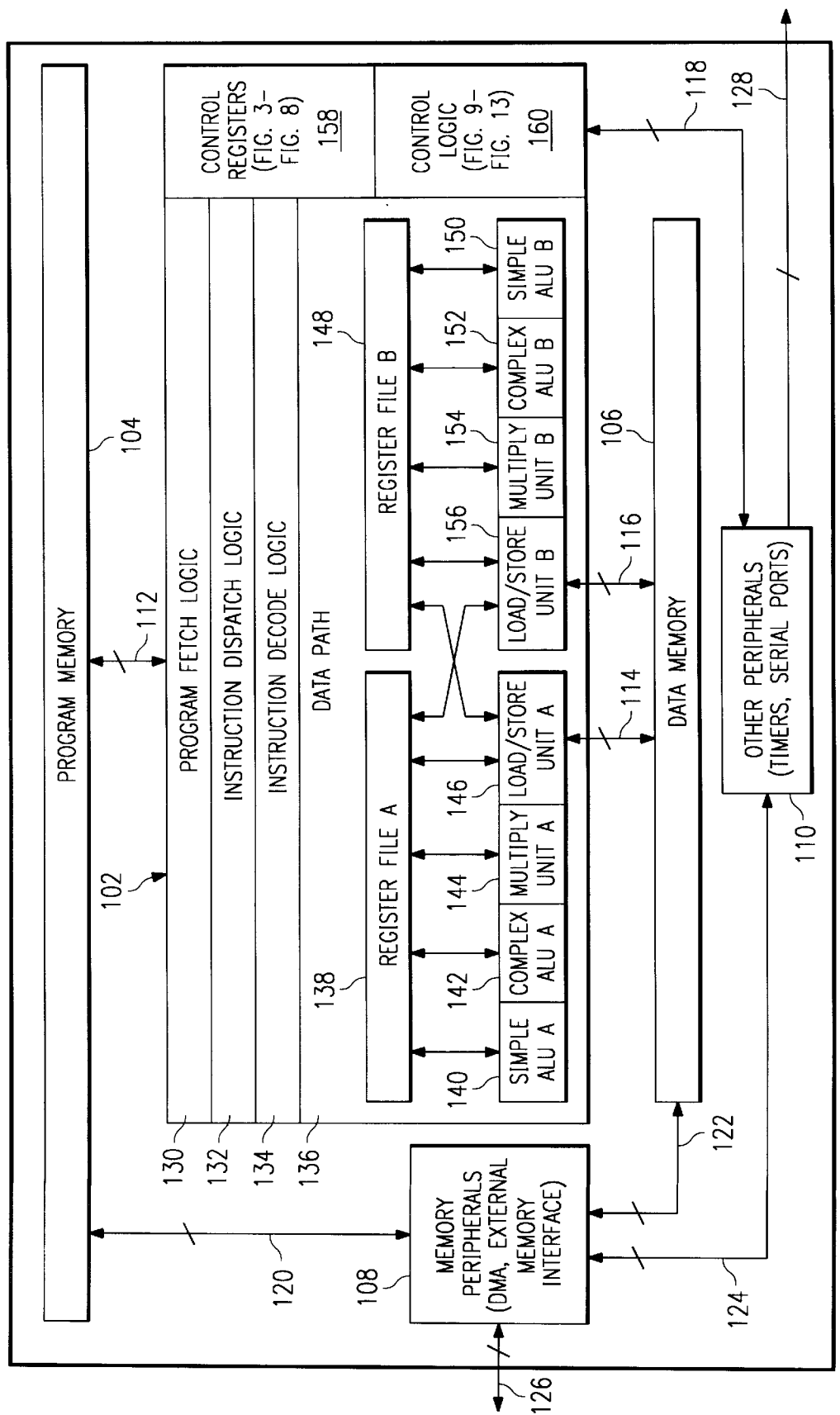
FIG. 1 depicts a block diagram of a data processor in which the present invention is practiced.

FIG. 1 depicts a block diagram of a data processor 100 in which the present invention is practiced. Data processor 100 is an advanced electronic device, incorporating pipelined operation and superscalar instruction dispatch to multiple execution units with integrated memory and peripherals. These features increase the instruction throughput during normal operation. Furthermore, data processor 100 incorporates a sophisticated interrupt scheme to accelerate the processing of interrupts during non-normal operation. Data processor 100 supports a RESET interrupt, a non-maskable interrupt (NMI) and multiple maskable interrupts ($MI_4$–$MI_{15}$).

NMI is the second highest priority interrupt. Normally the NMI is not maskable. When an NMI is asserted by some device or process, data processor 10 will cease its operation and branch to the NMI service routine. Ordinarily, this is the object of a non-maskable interrupt. However, this interruption may be undesirable if data processor 100 is already processing a RESET interrupt. In this case, it is undesirable to pause the RESET processing. Conversely, it is undesirable to allow the user of data processor 100 to be able to mask the NMI. If users were able to mask the NMI, then the user might inadvertently mask the NMI when it was inappropriate to do so. According to one aspect of the present invention, data processor 10 automatically "masks" NMI when it processes a RESET interrupt. The user can then "unmask" the NMI to allow NMI processing during the RESET routine or later, after the RESET routine. However, the user cannot mask NMI himself. This scheme ensures that an NMI interrupt will not interrupt a RESET routine nor will it be inadvertently disabled. Continuing with FIG. 1, data processor 100 contains a central processing unit, or core, 102, program memory 104, data memory 106, memory peripherals 108, and other peripherals 110. Core 102 is bi-directionally connected to program memory 104 by a bus 112, to data memory 106 by busses 114 and 116, and to other peripherals 110 by a bus 118. Memory peripherals 108 are bi-directionally connected to program memory 104 by a bus 120, to data memory 106 by a bus 122 and to the other peripherals by a bus 124. Memory peripherals 108 are connected to external devices by a bus 126. Similarly, other peripherals 110 are connected to external devices by a bus 128.

Core 102 contains program fetch logic 130, instruction dispatch logic 132, instruction decode logic 134, and datapath logic 136. Program fetch logic 130 is connected to program memory 104 by bus 112 and to instruction dispatch logic 132 by connections (not shown). Similarly, instruction dispatch logic 132 is connected to instruction decode logic 143 which in turn is connected to data path logic 136. Data path logic 136 contains a first register file 138 and four execution units: a simple arithmetic logic unit (ALU) 140, a complex ALU 142, a multiply unit 144, and a load/store unit 146. Register file 138 and execution units 140 through 146 operate as a set and are illustrated with the moniker "A." Register file 138 is bi-directionally connected to each of execution units 140 through 146. Data path logic 136 also contains a second register file 148 and four execution units: a simple arithmetic logic unit (ALU) 150, a complex ALU 152, a multiply unit 154, and a load/store unit 156. Register file 148 and execution units 150 through 156 operate as a set and are illustrated with the moniker "B." Register file 148 is bi-directionally connected to each of execution units 150 through 156. Load/store unit A and load/store unit B are also bi-directionally connected to register file B and to register file A, respectively. Core 102 also contains a set of control registers 158 and control logic 160. Control registers 158 and control logic 160 are connected to the remaining circuits in core 102.

Program memory 104 and data memory 106 may be instantiated by one or more of several memory technologies as required by the particular application in which data processor 100 is intended for use: static random access memory (SRAM), dynamic random access memory (DRAM), read only memory (ROM), erasable programmable read only memory (EPROM), etc.

Memory peripherals 126 contain a direct memory access (DMA) device and an external memory interface. When programmed by core 102, the DMA device can automatically transfer large blocks of data between an external memory system (not shown) and data memory 106. The external memory interface coordinates memory transfers between (1) program memory 104, data memory 106, and the DMA device and (2) the external memory system. Memory peripherals 126 may contain other memory related devices.

Other peripherals 110, contains timers, serials ports, and other peripherals as required by a particular application.

The general operation of data processor 100 is described below in connection with FIG. 2. The interrupt operation of data processor 100 is described below in connection with FIGS. 3 through 13. Interrupt polling is described below in connection with FIG. 14.

General Operation

FIG. 2 depicts a timing diagram of an instruction executed by data processor 100 illustrated in FIG. 1. As described above, data processor 100 is a pipelined superscalar device. In a pipelined device, instructions flow sequentially through different stages like automobiles through an assembly line. Ideally, each stage contains a different instruction in a different stage of execution. In a superscalar device, each stage contains two or more instructions. Instruction interdependencies can limit the number of instructions simultaneously processed in any stage to less than the maximum amount. In the described embodiment, instruction execution is broken into three stages: fetch, decode, and execute. In the fetch stage, data processor 100 retrieves each instruction or group of instructions for execution from a memory storage system. The fetch stage is divided into four phases: program generate (PG), program send (PS), program wait (PW) and program ready (PR). In the decode stage, data processor 100 routes each instruction to the correct execution unit. The decode stage is divided into two phases: dispatch (DP) and decode (DC). In the execute stage, data processor 100 performs each instruction as specified in the instruction opcode. Data processor 100 uses values from register fields 138 and 148 as the operands of the executed instructions. Execution units 140 through 146 and 150 through 156 execute particular classes of instructions as indicated by their names. Simple ALUS 140 and 150 execute logical functions excluding shift operations. Complex ALUS 142 and 152 execute all logical functions including shift operations. Multiply units 144 and 154 execute multiply instructions. Load/store units 146 and 156 execute memory transfer operations and certain logical instructions related to addressing modes. The execute stage is divided into five phases: E1 through E5.

Fetch Stage
PROGRAM GENERATE PHASE (PG). During the PG phase, program fetch logic 130 calculates the address of the next instruction to execute. One of control registers 158 is maintained for this address. Normally, program fetch logic 130 increments the contents of this register by 32 each cycle. (The described embodiment fetches eight four-byte instructions each cycle.) At other times, other values may be forced into the register to branch to a new instruction stream or to retrieve an interrupt service routine.

Program Send Phase (PS)

During the PS phase, program fetch logic 130 sends the address calculated in the PG phase to program memory 104.

Program Wait Phase (PW)

During the PW phase, program memory 104 accesses the data requested in the PS phase. In the described embodiment, program memory 104 contains a subset of memory values contained in a larger external memory system (not shown). Program memory 104 "caches" recently used data memory for rapid access later. If program memory 104 contains the requested instructions, then it sends them to program fetch logic 130 in the following phase. If program memory 104 does not contain the requested data, then program memory 104 must retrieve the data from the external memory system through memory peripherals 108. In this latter case, data processor 100 pauses all operations while the external memory system returns the data to program memory 104.

Program ready phase (PR)

During the program ready phase, program memory 104 returns eight instructions (a "fetch packet") to core 102 beginning at the address calculated in the PG phase.

Decode Stage

Dispatch Phase (DP)

During the DP phase, instruction dispatch logic 132 determines how many of the eight instructions can be executed in the same cycle. In the described embodiment, each instruction contains a p-bit field which indicates whether the following instruction can be executed in parallel. Instruction decode logic 134 separates the fetch packet into one or more execute packets. An execute packet is a group of instructions which can be executed in parallel. In other embodiments, the process of separating each fetch packet into one or more execute packets can be done without the use of a p-bit by core 102.

Decode phase (DC)

During the DC phase, instruction decode logic 134 routes the instructions in the current execute packet to the appropriate execution unit. In the described embodiment, each instruction contains a destination field which indicates its destination execution unit. In other embodiments, the process of directing each instruction to the correct execution unit can be done without the use of a destination-field by core 102.

Execute Stage

E1. During the E1 phase, the conditions for all instructions are evaluated and the operands are read. In the described embodiment, each instruction contains a condition field specifying a condition register to test and a particular test to apply to the condition register. If the test applied to the condition register is true, then the instruction is executed. Otherwise, the instruction is discarded and no further processing is required. Other instructions can write values to the various condition registers, thereby linking the execution of instructions with the results of prior instructions. Load/store units 146 and 156 calculate the addresses of their memory destinations and sources in this phase. The results of non-multiply, non-load/store instructions are calculated in this phase and are written to the destination register in register files 138 and 148.

E2. During the E2 phase, load/store units 146 and 156 send their addresses to data memory 106. Complex instructions, such as multiply instructions complete and write their results back to register files 138 and 148. Not all instructions require an E2 phase.

E3. During the E3 phase, data memory 106 performs the memory access specified by load/store units 146 and 156. In the described embodiment, data memory 106 contains a subset of memory values contained in a larger external memory system. Data memory 106 "caches" recently used data memory for rapid access later. If data memory 106 contains the requested data, then data memory 106 can respond quickly. In the case of a load to data present in data memory 106, data memory 106 sends it to load/store units 146 or 156 in the following cycle. In the case of a store to data present in data memory 106, data memory 106 stores the data from load/store units 146 into the appropriate memory location. If data memory 106 does not contain the requested data, then program memory 106 must retrieve the data from the external memory system through memory peripherals 108. In this latter case, data processor 100 pauses all operations while the external memory system returns data to data memory 106. Not all instructions require an E 3 phase.

E4. During the E4 phase, any data from a load operation is brought into load/store unit 146 or 156. Not all instructions require an E4 phase.

E5. During the E5 phase, any data from a load operation is stored into the target register in register files 138 and 148. Not all instructions require an E5 phase.

In the described embodiment, memory peripherals 108 and other peripherals 110 are mapped into the memory space of data processor 100. To activate a DMA operation or a timer, for instance, load/store units 146 or 156 are used to write particular values to memory addresses associated with these peripherals. The peripherals then use these values as start address for memory transfers or values from which to count down.

Interrupt Operation

The interrupt operation of data processor 100 is described by the interaction of three architectural features of data processor 100: fourteen interrupt signals, eight control registers, and the interrupt service table (IST).

Interrupt signals

Data processor 100 supports up to fourteen separate interrupts, divided into three classes: RESET, a non-maskable interrupt (NMI), and twelve maskable interrupts ($MI_4$–$MI_{15}$). These interrupts can be connected to external or internal devices as necessary. The relative priority of each is graphically illustrated below in Table 1:

TABLE 1

| Priority | Name |
| --- | --- |
| Highest | RESET |
|  | NMI |
|  | INT4 |
|  | INT5 |
|  | INT6 |
|  | INT7 |
|  | INT8 |
|  | INT9 |
|  | INT10 |
|  | INT11 |
|  | INT12 |
|  | INT13 |
|  | INT14 |
| Lowest Priority | INT15 |

RESET is the highest priority interrupt. RESET will interrupt any process when it is asserted. Within data processor 100, RESET is an active low signal so that it can be "asserted" in the event of a loss of power.

NMI is the second highest priority interrupt. Normally the NMI is also not maskable. When an NMI is asserted by some device or process, data processor 10 will cease its operation and perform the NMI service routine. Data processor 10 automatically "masks" NMI when it processes a RESET interrupt. However, the user cannot mask NMI himself. The user can unmask NMI during or after the RESET service routine. This strategy prevents an NMI from interrupting a RESET service routine. The masking/unmasking of NMI is described below in connection with FIG. 4 and FIG. 10.

As a class, the twelve maskable interrupts are the lowest priority interrupts. Interrupts $MI_4$–$MI_{15}$ are junior to both the RESET interrupt and to NMI. With respect to other maskable interrupts, MIj is senior to MIj+1 through $MI_{15}$, where j is an integer index ranging from 4 to 14. The masking/unmasking of $MI_4$–$MI_{15}$ is described below in connection with FIG. 4.

Control Registers

FIGS. 3 through 8 depict a graphical representation of various control registers of data processor 100 illustrated in FIG. 1 used in interrupt processing. In addition, two other registers (not depicted) participate in interrupt handling.

Control Status Register (CSR)

In FIG. 3, CSR 300 contains two fields related to interrupt handling: a global interrupt enable bit (GE, bit 0) and a prior global interrupt enable bit (PGIE, bit 1). If GIE=1, then data processor 100 will latch and service $MI_4$–$MI_{15}$. (NMIE, below, must also be set.) Data processor 100 latches interrupts in an interrupt flag register as described below in connection with FIG. 5. If GIE=0, then data processor will latch interrupts but will not service them. Data processor may poll latched interrupts at a later time. Interrupt polling is described below in connection with FIG. 14. Data processor 100 automatically stores GIE into PGIE when it branches to an interrupt routine. Data processor 100 automatically returns PGIE to GIE after completing an interrupt.

Interrupt Enable Register (ER)

In FIG. 4, IER 400 contains thirteen single bit fields related to interrupt handling: a non-maskable interrupt enable (NMIE, bit 1) and interrupt enable$_4$ through interrupt enable$_{15}$ (IE4 through IE15, bits 4 through 15). If NMI=1, then data processor 100 will latch and service NMI. If NMIE=0, then data processor 100 will latch but will not service NMI. When data processor 100 services a RESET interrupt, it automatically sets NMIE to zero. The user cannot clear NMIE himself The user can set NMIE to enable NMI interrupts. If IEj =1, then data processor 100 will latch and service the jth maskable interrupt. (GIE must also be set.) If IEj=0, then data processor 100 will latch but will not service the jth maskable interrupt. The user can clear and set the IE fields by writing to and reading from the IER.

Interrupt Flag Register (IFR)

In FIG. 5, IFR 500 contains thirteen single bit fields related to interrupt handling: a non-maskable interrupt flag (NMF, bit 1) and interrupt flag$_4$ through interrupt flags$_{15}$ (IF4 through IF15, bits 4 through 15). All fields are set to zero on RESET. Upon receipt of an interrupt, data processor 100 automatically loads a one into the field corresponding to the interrupt. The user can indirectly clear and set the NMIF and IF fields. The setting and clearing of the IF fields is described below in connection with FIGS. 7 and 8.

Interrupt Service Table Pointer (ISTP)

Figure 6:
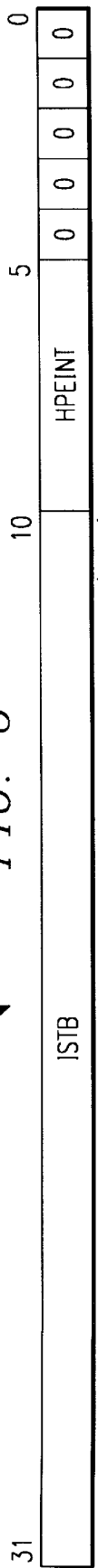

In FIG. 6, ISTP 600 contains two fields related to interrupt handling: an interrupt service table base field (ISTB, bits 10 through 31) and a highest priority enabled interrupt field (HPEINT, bits 5 through 9). Both fields are cleared by a RESET. The ISTB field is user accessible and establishes a base address for all interrupt service routines. Data processor 100 automatically calculates the HPEINT field each cycle. The HPEINT is readable by the user to facilitate interrupt polling. The HPEINT field identifies the highest priority, enabled interrupt each cycle. The concatenation of the ISTB and HPEINT fields identifies a byte address at which each interrupt service routine begins. In the described embodiment, data processor 100 allocates 32 bytes to each interrupt service routine. Therefore, the ISTP also contains five least significant zeros.

Interrupt Set Register (ISR)

Figures 7, 8, 9:
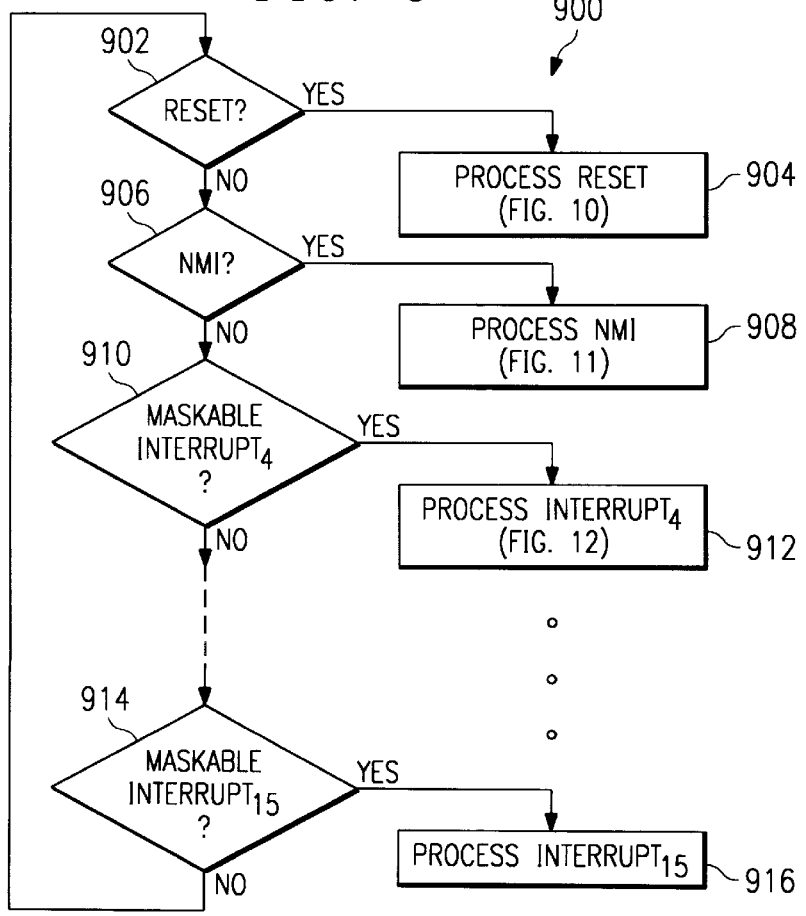

In FIG. 7, ISR 700 contains twelve single bit fields related to interrupt handling: interrupt set flag$_4$ through interrupt set flag$_{15}$ (IS4 through IS15, bits 4 through 15). The user can write one or more ones to this register. Data processor 10 will then write a one to the corresponding interrupt flag field. Writing a zero to any field has no effect.

Interrupt Clear Register (ICR)

In FIG. 8, ICR 800 contains twelve single bit fields related to interrupt handling: interrupt clear flag$_4$ through interrupt clear flag$_{15}$ (IC4 through IC15, bits 4 through 15). The user can write one or more ones to this register. Data processor 10 will then write a zero to the corresponding interrupt flag field. Writing a zero to any field has no effect.

Interrupt Return Pointer (IRP)

Data processor 100 automatically loads the IRP with the thirty-two bit address of the first execute packet in the program flow that was not executed because of a maskable interrupt. The user can also write to this register. A branch instruction using the IRP returns to the previous program flow prior to servicing the maskable interrupt.

Non-Maskable Return Pointer (NRP)

Data processor 100 automatically loads the NRP with the thirty-two bit address of the first execute packet in the program flow that was not executed because of an NMI. The user can also write to this register. A branch instruction using the NRP returns to the previous program flow prior to servicing the NMI.

Interrupt Service Table (IST)

The IST is a memory construct for the orderly storage of interrupt service routines or fetch packets. The IST consists of 16 contiguous blocks of memory. Each interrupt is allocated one of the blocks (two reserved) to store an appropriate interrupt service routine or links to one. After RESET, the IST begins at address zero. Thereafter, the user can relocate the IST by writing to the ISTB field of the ISTP. In this case, the IST begins at a memory location specified by the concatenation of the ISTB field and ten least significant zeros. In the described embodiment, memory addresses are 32-bits in length, the ISTB field is 22-bits long and thirty two interrupts are provided for in the 5-bit HPEINT field (sixteen reserved). Therefore, each block begins $2^{(32-22-5)}$ or $2^5$ or thirty-bytes after the prior block. Table 2 below graphically illustrates the order and spacing of the interrupt blocks. All addresses are in hexadecimal format.

TABLE 2

| Interrupt | ISFP Address |
|---|---|
| RESET | ISTB + 000 |
| NMI | ISTB + 020 |
| reserved | ISTB + 040 |
| reserved | ISTB + 060 |
| INT4 | ISTB + 080 |
| INT5 | ISTB + 0A0 |
| INT6 | ISTB + 0C0 |
| INT7 | ISTB + 0E0 |
| INT8 | ISTB + 100 |
| INT9 | ISTB + 120 |
| INT10 | ISTB + 140 |
| INT11 | ISTB + 160 |
| INT12 | ISTB + 180 |
| INT13 | ISTB + 1A0 |
| INT14 | ISTB + 1C0 |
| INT15 | ISTB + 1E0 |

As described above in connection with the ISTP, data processor 100 determines which of the sixteen blocks to branch to in the event of an interrupt through the HPEINT field of the ISTP. Each cycle, data processor 100 determines which is the highest priority enabled interrupt and writes the number of that interrupt into the HPEINT field. For a particular interrupt, the concatenation of the ISTB field, the HPEINT field resulting from that interrupt, and five least significant zeros results in the starting address of the block allocated to the particular interrupt. For instance, if the fourth maskable interrupt is the highest enabled interrupt, then data processor 100 will write four, 0 0010b, to the HPEINT field. Binary four concatenated with five least significant zeros is 00 0100 0000b or 080h.

FIG. 9 depicts a flow diagram 900 of one aspect of the operation of data processor 100 illustrated in FIG. 1. Each cycle, data processor 100 executes the steps illustrated in FIG. 9. First, data processor 100 determines if RESET is asserted, a step 902. If RESET is asserted, then data processor processes the RESET, a step 904. Step 904 is further described in connection with FIG. 10. If RESET is not asserted, then data processor determines if NMI is asserted and enabled, a step 906. If NMI is asserted, then data processor processes the NMI, a step 908. Step 908 is further described in connection with FIG. 11. If NMI is not asserted, then data processor determines if $MI_4$ is asserted and enabled, a step 910. If $MI_4$ is asserted, then data processor processes the maskable interrupt, a step 912. Step 912 is further described in connection with FIG. 12. Data processor 100 continues checking each maskable interrupt and, if asserted, processing the maskable interrupt. Eventually, data processor 100 determines if $MI_{15}$ is asserted and enabled, a step 914. If $MI_{15}$ is asserted, then data processor 100 processes the maskable interrupt, a step 916. Step 916 is substantially similar to step 912 with the replacement of each reference to $MI_4$ with a reference to $MI_{15}$. Data processor 100 returns to step 902 at the beginning of the next machine cycle. It should be understood, that data processor 100 will respond to no more than one interrupt.

Figure 10:
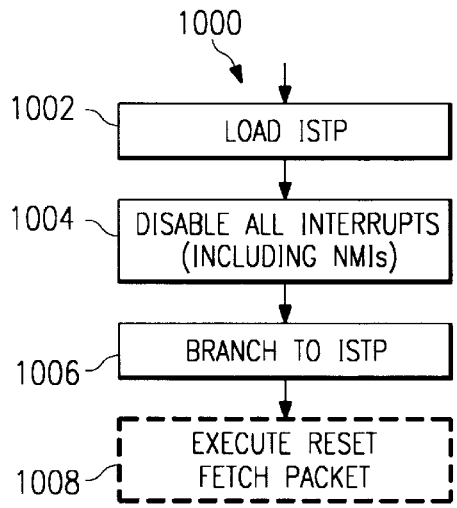
FIG. 10 depicts a flow diagram of one step illustrated in FIG. 9.

FIG. 10 depicts a flow diagram 1000 of step 904 illustrated in FIG. 9. Upon detecting a RESET, data processor 100 writes 0 000b to the HPEINT field of the ISTP, a step 1002. Next, data processor 100 disables all interrupts, including NMI, a step 1004. Data processor 100 disables NMI and each maskable interrupt by writing a zero to each interrupt enable field of the IER This step prevents an NMI or any maskable interrupt from interrupting a RESET service routine. Finally, data processor 100 executes a pseudo-instruction by branching to the address specified by the ISTP, a step 1006. Data processor 100 will execute the RESET service routine, or fetch packet, as written by the user, a step 1008. The user can re-enable the NMI by setting the NMIE field once the RESET service routine is compete, is likely to be completed, or when its interruption will not effect system performance. The user can also enable maskable interrupts by setting GIE and the appropriate fields in the IER.

Figure 11:
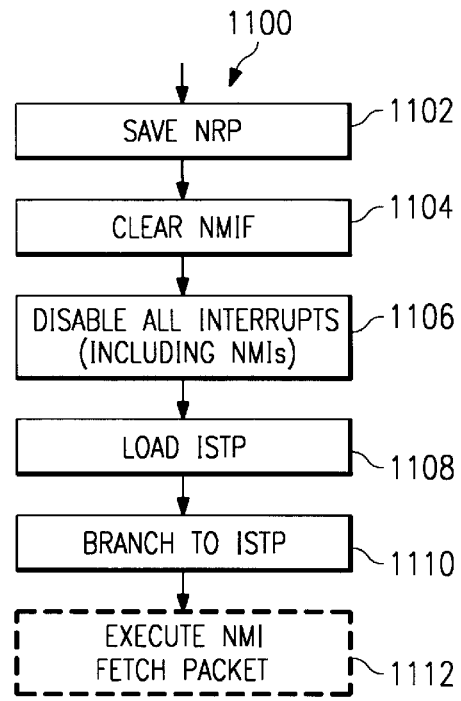
FIG. 11 depicts a flow diagram of one step illustrated in FIG. 9.

FIG. 11 depicts a flow diagram 1100 of step 908 illustrated in FIG. 9. Upon detecting an NMI, data processor 100 saves the address of the next instruction to process into the NRP, a step 1102. Next, data processor 100 clears the NMIF field, a step 1104. This step ensures that the same interrupt will not be serviced twice. Again, data processor 100 disables all interrupts, including NMI, a step 1106. Data processor 100 writes 0 0001b into the EPEINT field of the ISTP, a step 1108. Finally, data processor 100 executes a pseudo-instruction by branching to the address specified by the ISTP, a step 1110. Data processor 100 will execute the NMI service routine as written by the user, a step 1112. The user can re-enable the NMI and maskable interrupts as described above. Typically, the final instruction of the NMI service routine will be a branch to the contents of the NRP. Data processor 100 will then return to the instruction stream it was processing prior to the NMI.

Figure 12:
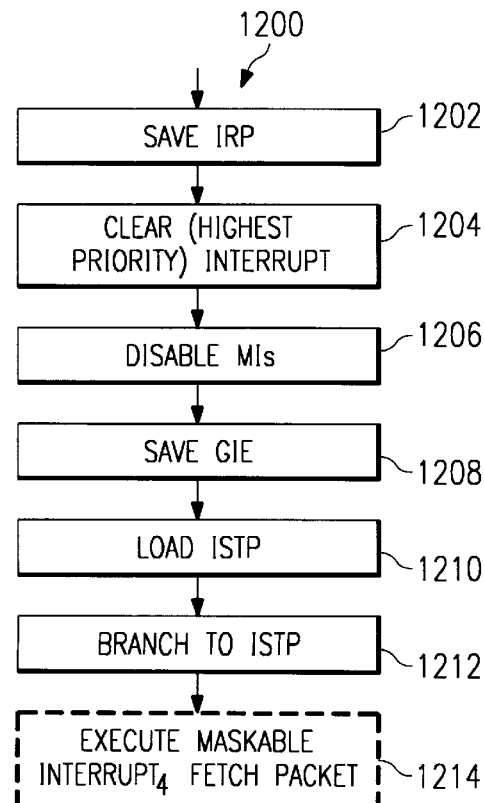
FIG. 12 depicts a flow diagram of one step illustrated in FIG. 9.

FIG. 12 depicts a flow diagram 1200 of step 912 illustrated in FIG. 9. Upon detecting a maskable interrupt (here $MI_4$), data processor 100 saves the address of the next instruction to process into the IRP, a step 1202. Next, data processor 100 clears the highest priority enabled IF field, a step 1204. This step ensures that the same interrupt will not be serviced twice. Data processor 100 disables all maskable interrupts, a step 1206. The use of a separate IRP and NRP allows an NMI to interrupt a maskable interrupt. Next, data processor 100 reads the contents of the GIE field and saves it into the PGIE field, a step 1208. Data processor 100 writes 0 0010b into the HPEINT field of the ISTP, a step 1210. As described above, data processor 1200 will write a different value into the HPEINT field depending upon which interrupt is asserted. Finally, data processor 100 executes a pseudo-instruction by branching to the address specified by the ISTP, a step 1212. Data processor 100 will execute the interrupt service routine as written by the user, a step 1214. The user can re-enable the maskable interrupts as described above. Typically, the final instruction of the maskable interrupt service routine will be a branch to the contents of the IRP. This instruction will automatically load the contents of the PGIE into the GIE. Data processor 100 will then return to the instruction stream it was processing prior to the maskable interrupt.

Figure 13:
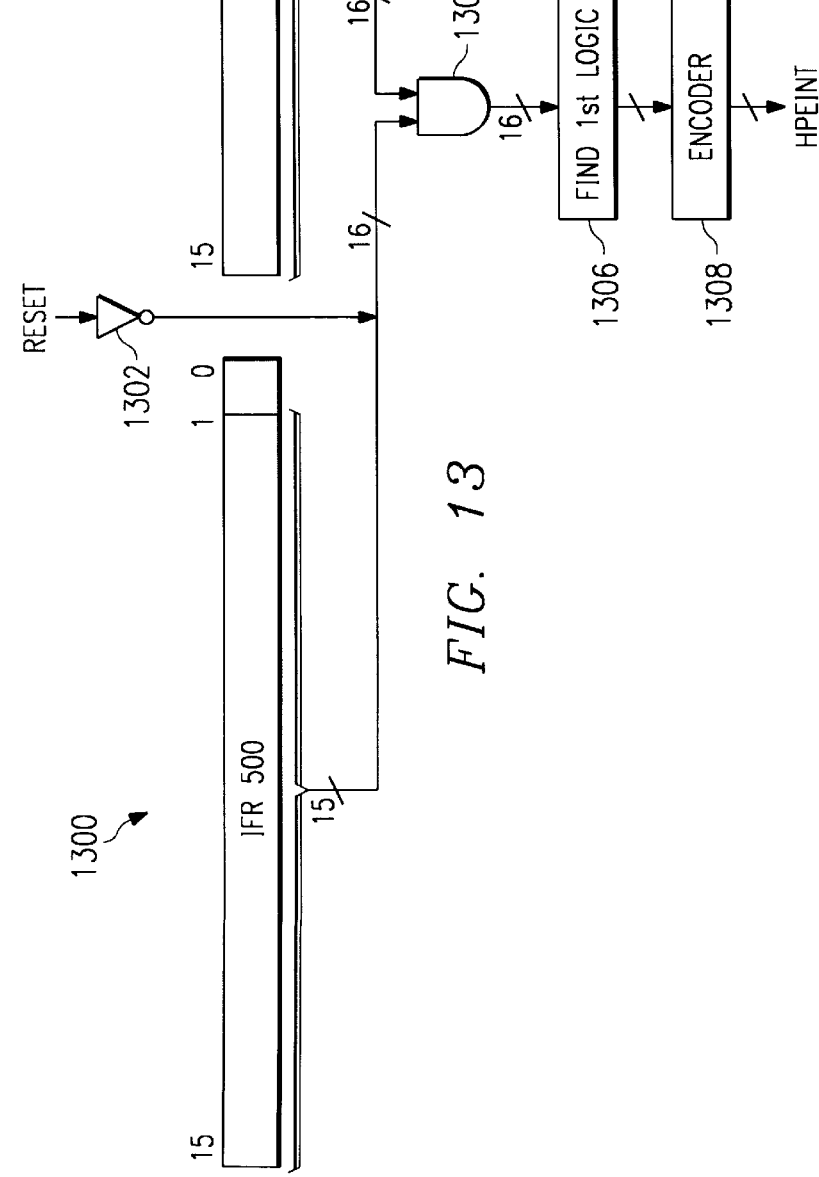
FIG. 13 depicts a block diagram of a portion of the data processor illustrated in FIG. 1.

FIG. 13 depicts a block diagram 1300 of a portion of data processor 100 illustrated in FIG. 1. Block diagram 1300 generates the HPEINT field each cycle. Bits 15 through 1 of IFR 500 and the output of an inverter 1302 are bit-wise ANDed with the sixteen least significant bits of IER 400 by an AND gate 1304. An input of inverter 1302 receives the signal RESET. AND gate 1304 generates a 16-bit vector identifying those interrupts that are both enabled and asserted. A find-first logic block 1306 determines which is the right-most asserted bit in the 16 -bit output of AND gate 1304. Finally, an encoder 1308 converts the output of find-first logic block 1306 from a "one-hot" form into a binary-weighted form.

Interrupt Polling

Figure 14:
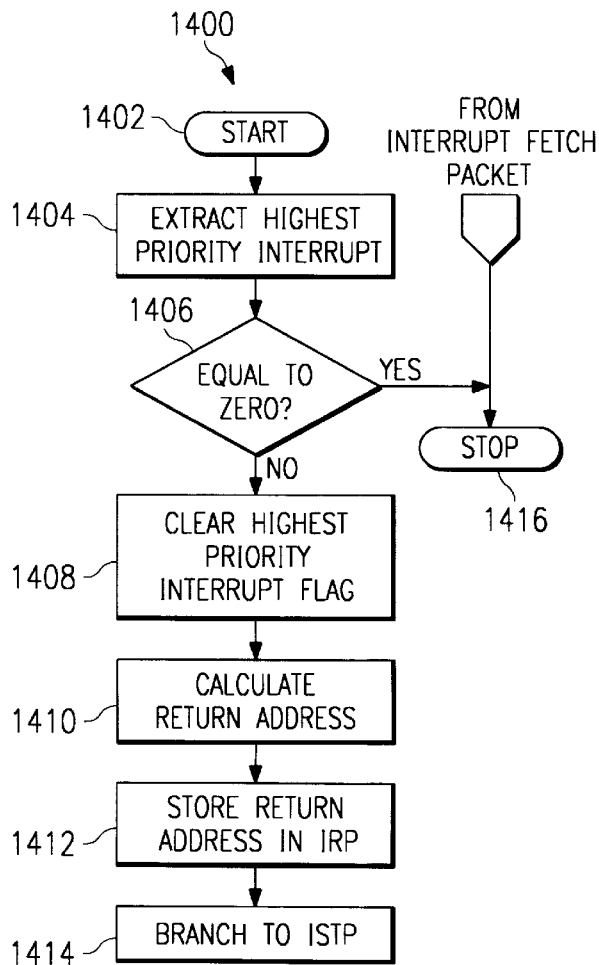
FIG. 14 depicts a flow diagram of a method of operating the data processor illustrated in FIG. 1.

FIG. 14 depicts a flow diagram 1400 of a method of operating data processor 100 illustrated in FIG. 1. Flow diagram 1440 depicts steps useful when it is desirable to disable maskable interrupts. In some cases it may not be desirable to interrupt the data processor's normal operation if maskable interrupts are associated with non-time critical processes. In these cases, data processor 100 will only determine whether any interrupt is in need of servicing when it is convenient to do so. This process is called interrupt "polling." Flow diagram 1400 represents instructions programmed by a user and executed by data processor 100.

Flow diagram 1400 starts at a step 1402. First, data processor 100 extracts the identify of the highest priority interrupt, a step 1404. Data processor 100 extracts the identity of the highest priority interrupt by reading the ISTP, clearing the twenty-two most significant bits of the ISTP, and right-shifting the result five digits. The resulting value is highest priority enable interrupt in binary-weighted form. Next, data processor 100 determines if this field is equal to zero, a step 1406. If the field is non-zero, then an interrupt is pending. If the field is zero, then no interrupt is pending.

If an interrupt is pending, then data processor 100 performs several functions before servicing the interrupt. First, data processor 100 clears the IFR field corresponding to the senior pending interrupt. Data processor 100 clears the interrupt by loading a one into a register, shifting the one leftwards a number of places corresponding to the interrupt number and writing this value into the ICR. This step prevents the same interrupt from being serviced twice. Next, data processor 100 calculates the address it should return to after servicing the pending interrupt, a step 1410. Typically, this address is determined by a compiler prior to execution by data processor 100. Data processor 100 loads the return address into the IRP, a step 1412. Finally, data processor 100 executes a branch instruction to the address specified by the ISTP. Data processor 100 will execute the interrupt service routine as written by the user as described above in connection with FIG. 12.

If the extracted field is equal to zero in step 1406, then there is no pending interrupt. Flow diagram 1440 stops, a step 1416. (Note, RESET is always serviced immediately. A zero output from step 1404 indicates that no interrupt is pending. A zero field does not indicated that a RSET is pending.)

Although the present invention and its advantages have been described in detail, it should be understood that various changes, substitutions and alterations can be made herein without departing from the spirit and scope of the invention as defined by the appended claims.

what is claimed is:

1. A data processor operable to execute instructions and to receive a first interrupt and a second interrupt, the data processor comprising:

a control register having a first field, the control register writeable by a user of the data processor to a first logic state only; and control circuitry, upon assertion of the first interrupt, executing a first interrupt service routine and writing a second logic state to the control register, upon assertion of the second interrupt, executing a first second service routine if and only if the control register equals the first logic state.

2. A data processor comprising:

an interrupt enable register storing a first field, the interrupt enable register operable to store a first logic state in the first field responsive to a write command, the interrupt enable register inoperable to store a second state responsive to the write command;

fetch logic for fetching instructions to execute;

data path logic coupled to the fetch logic, the data path logic executing the instructions;

control logic coupled to the fetch logic and to the interrupt enable register, the control logic supplying a first address of a first instruction to fetch upon an assertion of a first interrupt and setting the first field of the interrupt enable register to the second logic state, the control logic supplying a second address of a second instruction to fetch upon an assertion of a second interrupt if and only if the first field of the interrupt enable register corresponds to the first logic state.

3. The data processor of claim 2 wherein:

the interrupt enable register further comprises a second field, the interrupt enable register operable to store a first logic state or a second logic state in the second field responsive to a write; and wherein the control logic further supplies a third address of a third instruction to fetch upon an assertion of a third interrupt if and only if the second field of the interrupt enable register corresponds to the first logic state.

4. The data processor of claim 3 wherein the control logic also sets the first field of the interrupt enable register to the second logic state when the control logic supplies the second address of the second instruction to fetch.

5. The data processor of claim 2 wherein the control logic also sets the first field of the interrupt enable register to the second logic state when the control logic supplies the second address of the second instruction to fetch.

* * * * *